(12) United States Patent
Xu et al.

(10) Patent No.: US 10,780,560 B2
(45) Date of Patent: Sep. 22, 2020

(54) INSTALLATION OF HARDWARE COMPONENTS IN A MOUNTING SURFACE USING A SPECIFICATION

(71) Applicant: International Business Machines Corporation, Armonk, NY (US)

(72) Inventors: Junfeng Xu, Tucson, AZ (US); Albert Dennes, Tucson, AZ (US); Gregory M. Ketterer, Tucson, AZ (US); Dave Bach, Phoenix, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/218,349

(22) Filed: Dec. 12, 2018

(65) Prior Publication Data

US 2020/0189076 A1 Jun. 18, 2020

(51) Int. Cl.
*B25B 23/14* (2006.01)
*B23P 19/06* (2006.01)

(52) U.S. Cl.
CPC ............ *B25B 23/14* (2013.01); *B23P 19/066* (2013.01)

(58) Field of Classification Search
CPC .. H01S 5/02415; H01S 5/0425; H01S 5/4025; H01S 5/02276; H01S 5/405; H01S 5/02288
See application file for complete search history.

(56) References Cited

U.S. PATENT DOCUMENTS

| 4,767,208 | A | * | 8/1988 | Cain | G01C 5/02 |
| | | | | | 356/138 |
| 5,994,688 | A | * | 11/1999 | Jackson | G01C 15/004 |
| | | | | | 250/206.2 |
| 6,375,395 | B1 | * | 4/2002 | Heintzeman | B25H 1/0092 |
| | | | | | 408/13 |
| 7,398,700 | B2 | | 7/2008 | Makimae et al. | |
| 7,823,465 | B2 | | 11/2010 | Makimae et al. | |
| 8,485,075 | B1 | | 7/2013 | Gauthier et al. | |
| 9,566,697 | B2 | | 2/2017 | Furuie | |
| 2006/0218768 | A1 | | 10/2006 | Makimae et al. | |
| 2009/0059213 | A1 | * | 3/2009 | Wesby | G01M 17/06 |
| | | | | | 356/139.09 |
| 2009/0067461 | A1 | * | 3/2009 | Hajmousa | G01C 15/004 |
| | | | | | 372/37 |
| 2009/0084231 | A1 | | 4/2009 | Makimae et al. | |
| 2009/0084232 | A1 | | 4/2009 | Makimae et al. | |

(Continued)

*Primary Examiner* — Kidest Bahta
(74) *Attorney, Agent, or Firm* — Zilka-Kotab, P.C.

(57) ABSTRACT

An embodiment includes instructing a light source to emit light within a hardware socket configured to disengage a hardware component from a mounting surface. Emitted light received at a detector while a first portion of the hardware component is in contact with the mounting surface is detected. One or more instructions are sent to cause a relative rotation between the hardware component and the mounting surface. The embodiment further includes detecting that the first portion of the hardware component is no longer in contact with the mounting surface, and recording an extent of relative rotation that occurs in response to the one or more instructions to disengage the first portion of the hardware component from the mounting surface until the detection that the first portion of the hardware component is no longer in contact with the mounting surface. The extent of relative rotation is stored.

20 Claims, 6 Drawing Sheets

(56) References Cited

U.S. PATENT DOCUMENTS

| | | |
|---|---|---|
| 2010/0116102 A1 | 5/2010 | Genestout |
| 2012/0293849 A1* | 11/2012 | Nakajima ............ G02B 26/123 359/204.1 |
| 2013/0213188 A1 | 8/2013 | Qi et al. |
| 2014/0373690 A1 | 12/2014 | Furuie |
| 2018/0012047 A1 | 1/2018 | Chu |

* cited by examiner

INSTALLATION OF HARDWARE COMPONENTS IN A MOUNTING SURFACE USING A SPECIFICATION

BACKGROUND

The present invention relates to hardware components, and more specifically, this invention relates to installation of hardware components in a mounting surface according to predetermined torque specifications, as well as an apparatus for performing such installation.

Hardware components are often used for coupling components together, reinforcing structures, supporting objects, etc. For example, some commonly used hardware components include bolts, screws, pins, etc.

Some hardware components are configured for permanent engagement with a mounting surface, while others are selectively removable from such mounting surfaces. Moreover, some hardware components are configured for engaging/disengaging with a mounting surface using a tool, e.g., a wrench, a screw head bit, an electrical device, etc., while in contrast, other hardware components are configured to engage/disengage with a mounting surface by manipulation of a user's hands, e.g., finger-tightening.

SUMMARY

A computer-implemented method according to one embodiment includes instructing a light source to emit light within a hardware socket configured to disengage a hardware component from a mounting surface. While the hardware socket is positioned about the hardware component, an amount of the emitted light received at a detector while a first portion of the hardware component is in contact with the mounting surface is detected. While the hardware socket is positioned about the hardware component, one or more instructions are sent to cause a relative rotation between the hardware component and the mounting surface. The method further includes detecting that the first portion of the hardware component is no longer in contact with the mounting surface, and recording an extent of relative rotation that occurs in response to the one or more instructions to disengage the first portion of the hardware component from the mounting surface until the detection that the first portion of the hardware component is no longer in contact with the mounting surface. The extent of relative rotation is stored.

A computer program product for maintaining torque specifications of a hardware component with a mounting surface according to another embodiment includes a computer readable storage medium having program instructions embodied therewith. The program instructions are readable and/or executable by a computer to cause the computer to perform the foregoing method.

An apparatus according to another embodiment includes a light source, a detector, a hardware socket configured to disengage a hardware component from a mounting surface, and a processor. The apparatus further includes logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
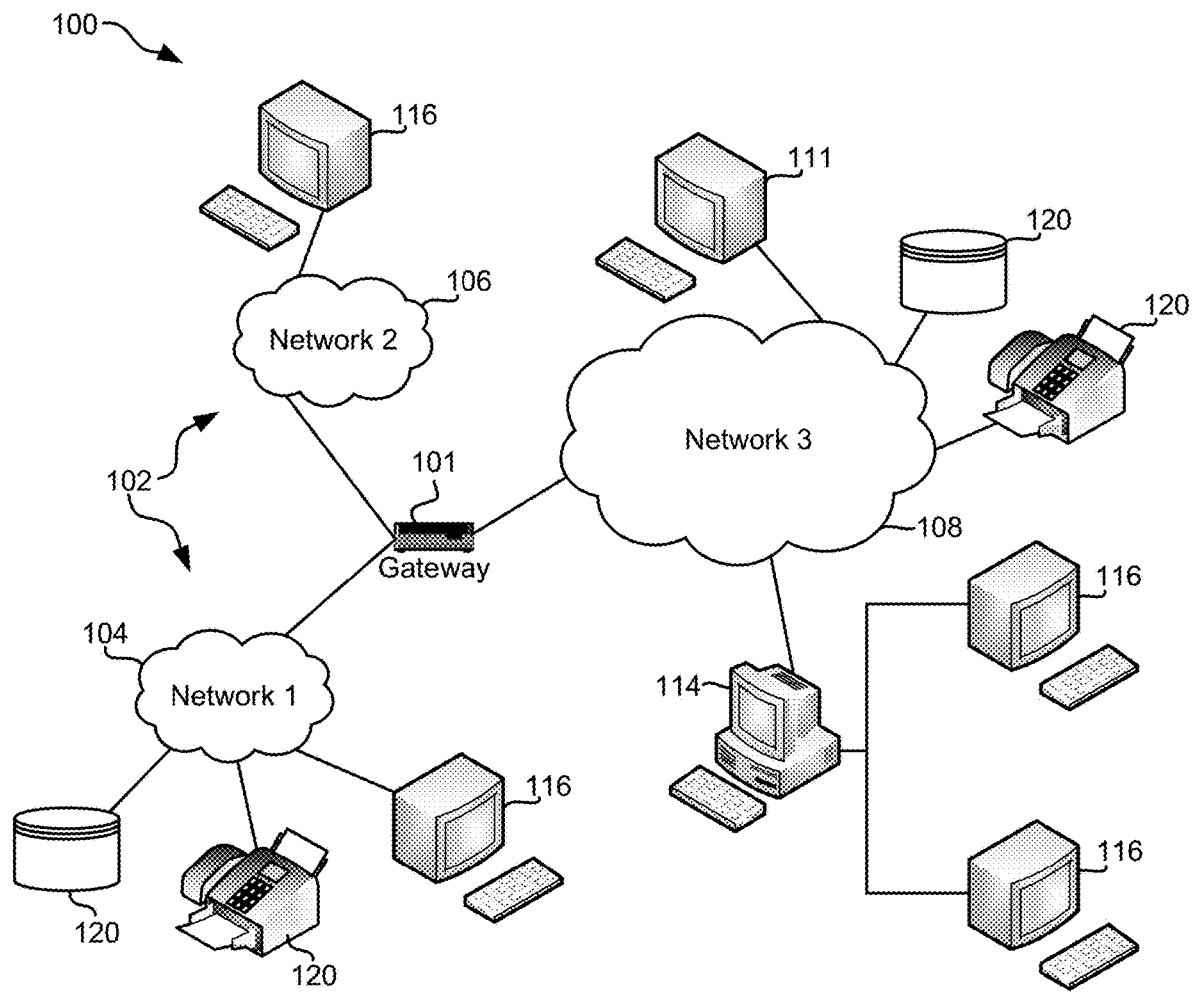
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for installation of hardware components in a mounting surface using a specification recorded during a previous disengaging of at least a portion of the hardware component from the mounting surface.

In one general embodiment, a computer-implemented method includes instructing a light source to emit light within a hardware socket configured to disengage a hardware component from a mounting surface. While the hardware socket is positioned about the hardware component, an amount of the emitted light received at a detector while a first portion of the hardware component is in contact with the mounting surface is detected. While the hardware socket is positioned about the hardware component, one or more instructions are sent to cause a relative rotation between the hardware component and the mounting surface. The method further includes detecting that the first portion of the hardware component is no longer in contact with the mounting surface, and recording an extent of relative rotation that occurs in response to the one or more instructions to disengage the first portion of the hardware component from the mounting surface until the detection that the first portion of the hardware component is no longer in contact with the mounting surface. The extent of relative rotation is stored.

In another general embodiment, a computer program product for maintaining torque specifications of a hardware component with a mounting surface includes a computer readable storage medium having program instructions embodied therewith. The program instructions are readable and/or executable by a computer to cause the computer to perform the foregoing method.

In another general embodiment, an apparatus includes a light source, a detector, a hardware socket configured to disengage a hardware component from a mounting surface, and a processor. The apparatus further includes logic integrated with the processor, executable by the processor, or integrated with and executable by the processor. The logic is configured to perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
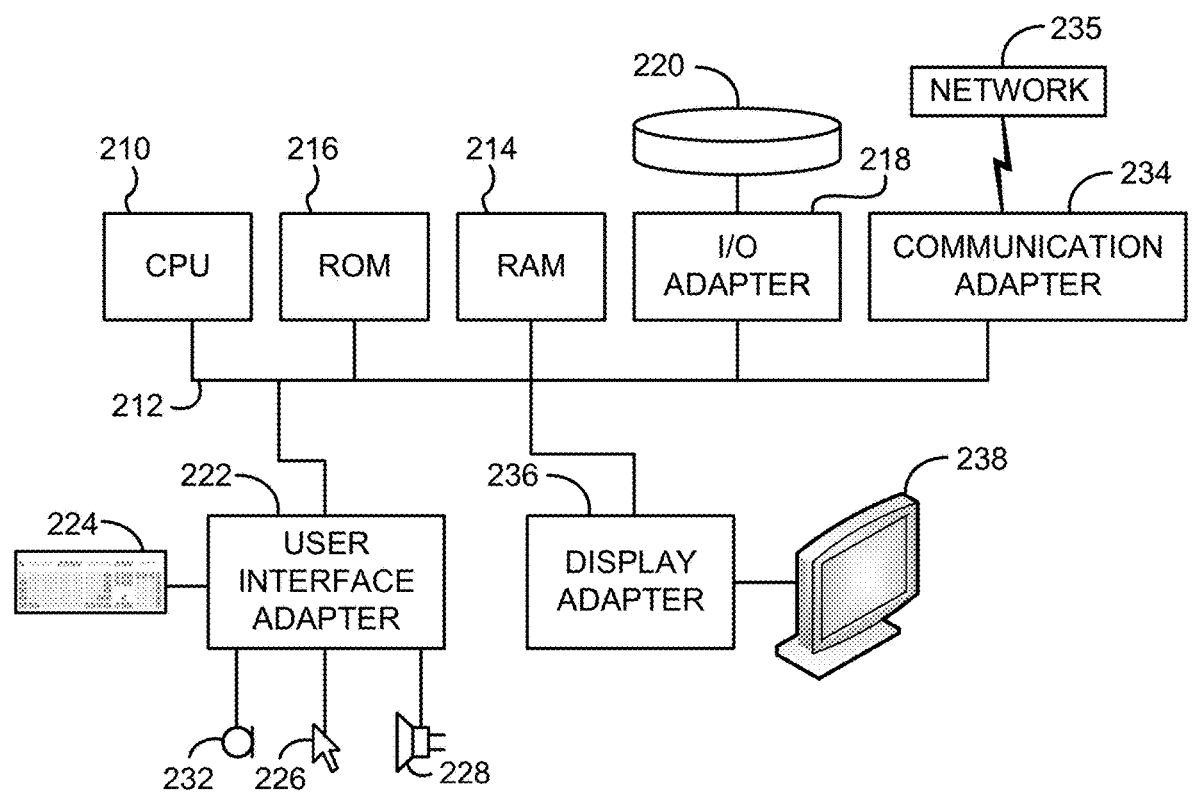
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Reference will now be made to hardware components and tools which may be included and/or utilized in the architecture and/or environment described elsewhere above and/or any other architecture and/or environment.

As mentioned elsewhere herein, hardware components are often used within architectures and/or environments for a variety of reasons. During engagement of some hardware components to a respective mounting surface and/or disengagement of some hardware components from a respective mounting surface, tools are sometimes used. For example, torque wrenches are typically used for applying rotational force to hardware bolts.

Various embodiments and/or approaches described herein include using a light source for recording an extent of rotation of a hardware component and/or the extent of rotation of a hardware socket when at least partially disengaging a hardware component from the mounting surface. The extent of rotation of a hardware component and/or the extent of rotation of a hardware socket may thereafter be applied when at least partially engaging the hardware component to the mounting surface in order to achieve original torque specifications of the hardware component to the mounting surface.

Figure 3:
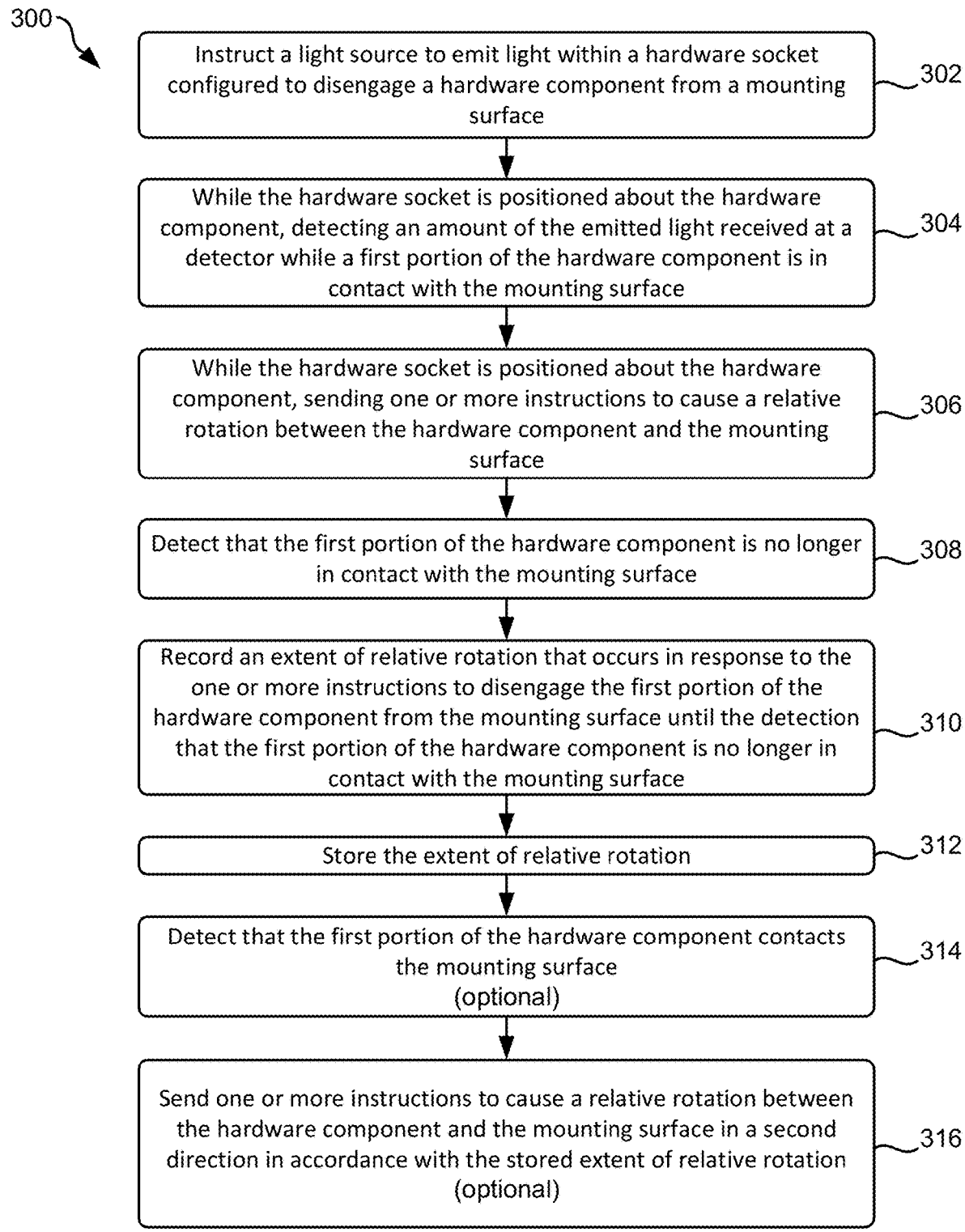
FIG. 3 is a flowchart of a method in accordance with one embodiment.

Now referring to FIG. 3, a flowchart of a method 300 is shown according to one embodiment. The method 300 may be performed in accordance with the present invention in any of the environments depicted in FIGS. 1-2 and 4A-5, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Operation 302 of method 300 includes instructing a light source to emit light within a hardware socket configured to disengage a hardware component from a mounting surface. According to various approaches, the hardware socket may be configured to engage with any type of hardware component, e.g., via a hex type fitting as shown at 402 in FIG. 4A/4B, via a pass through type fitting, via a universal joint type fitting, via a socket bit type fitting, etc. The hardware socket may additionally and/or alternatively include any standard of socket, e.g., Society of Automotive Engineers (SAE) unit socket sizes, metric unit socket sizes, English unit socket sizes, etc. Moreover, the hardware component may be any type of hardware component, e.g., a bolt, a screw, etc. Accordingly, disengagement of the hardware component from the mounting surface may depend on the type of hardware component and/or a type of hardware socket configured to engage/disengage the hardware component from the mounting surface, but will preferably include rotation of the hardware component and/or the hardware socket.

According to various approaches, the light source may include any type of light source, e.g., a laser, a light emitting diode (LED), a halogen light, a fiber optic extending from a light emitter, etc. As will be described in greater detail elsewhere herein, e.g., see FIGS. 4A-4D, depending on the approach, the light source may be positioned on and/or within and/or outside of any portion of the hardware socket that allows the light emitted from the light source to be directed to at least a portion of an interior of the hardware socket.

Operation 304 of method 300 includes detecting an amount, e.g., an initial amount, of the emitted light received at a detector while a first portion of the hardware component is in contact with the mounting surface. The initial amount of the emitted light is preferably detected by the detector while the hardware socket is positioned about the hardware component. Detecting the initial amount of the emitted light while the hardware socket is positioned about the hardware component prevents any changes in ambient and/or other light sources from being unintentionally detected by the detector. In other words, the hardware socket is positioned about the hardware component establishes a controlled environment within the hardware socket for accurate detection of the emitted light.

The detector may be any known type of light detector and may also be positioned on and/or within and/or outside of any surface of the hardware socket.

The first portion may be any portion of the hardware component. In one preferred approach, the first portion of the hardware component is a head extending from a threaded tail portion of the hardware component.

In some approaches, the initial amount of the emitted light received at a detector while the first portion of the hardware component is in contact with the mounting surface may be greater than zero. In at least one of such approaches, light received by the detector while the first portion of the hardware component is in contact with the mounting surface may originate from the light source and extend around the hardware component to the detector. For example, the light may extend across a gap that exists between an inner perimeter of the hardware socket and an outer perimeter of the first portion of the hardware component, e.g., as in one example will be described in greater detail in FIGS. 4A-4D.

In some other approaches, the initial amount of the emitted light received at a detector while a first portion of the hardware component is in contact with the mounting surface is zero, e.g., an absence of light detected. In at least one such approach, light is prevented from being received by the detector while the first portion of the hardware component is in contact with the mounting surface and the hardware socket is positioned about the hardware component, there being no gap therebetween that would otherwise allow light to travel from the light source to the detector.

Operation 306 of method 300 includes sending one or more instructions to cause a relative rotation between the hardware component and the mounting surface. In one approach, the relative rotation between the hardware component and the mounting surface may be caused by causing the hardware socket to rotate the hardware component in a first direction relative to the mounting surface, e.g., clockwise or counter-clockwise, e.g., by instructing a motorized tool that turns the hardware socket. In another approach, the relative rotation between the hardware component and the mounting surface may be caused by causing the mounting surface to rotate in a first direction relative to the hardware socket and the hardware component, e.g., by causing a substrate, mount, etc. coupled to the mounting surface to rotate while the hardware socket is maintained stationary. In yet another approach, both the hardware component and the mounting surface are caused to rotate in opposite directions. Such relative rotation in the first direction causes the first portion of the hardware component to disengage from the mounting surface.

The above described relative rotations may be performed by a single continuous rotational operation and/or by a plurality of separate rotational operations about a rotational axis of the hardware component.

In one approach, at some point during disengagement of the hardware component from the mounting surface, method 300 includes detecting that the first portion of the hardware component is no longer in contact with the mounting surface, e.g., see operation 308.

Depending on the approach, detection that the first portion of the hardware component is no longer in contact with the mounting surface may be performed using any one or more techniques. For example, in one approach, assume that the initial amount of the emitted light received at the detector while the first portion of the hardware component is in contact with the mounting surface, and while the hardware socket is positioned about the hardware component, is zero. In such an approach, detecting that the first portion of the hardware component is no longer in contact with the mounting surface includes detecting (for a first time) at least some amount of the emitted light received at the detector during relative rotation between the hardware component and the mounting surface in the first direction. In another approach, assume that the initial amount of the emitted light received at the detector while the first portion of the hardware component is in contact with the mounting surface, and while the hardware socket is positioned about the hardware component, is greater than zero. In such an approach, detecting that the first portion of the hardware component is no longer in contact with the mounting surface may include detecting an increase in the amount of the emitted light received at the detector during relative rotation between the hardware component and the mounting surface in the first direction. In these approaches, such an increase in light results from emitted light being able to travel from the light source, between the first portion of the hardware component and the mounting surface (and/or potentially along threads (if any) of a tail of the hardware component), to the detector. As will be described in greater detail elsewhere herein, e.g., see FIGS. 4B-4D, this increase in the amount of emitted light being received at the detector is made possible as a result of the first portion of the hardware component no longer being in contact with the mounting surface. Moreover, this increase in the amount of emitted light being received at the detector may additionally and/or alternatively be made possible as a result of at least a portion of a tail portion of the hardware component that now resides between the first portion of the hardware component and the mounting surface having less width than a width of the first portion of the hardware component, as will also be described in greater detail elsewhere herein, e.g., see FIGS. 4A-4D.

Operation 310 of method 300 includes recording an extent of relative rotation that occurs in response to the one or more instructions to disengage the first portion of the hardware component from the mounting surface until the detection that the first portion of the hardware component is no longer in contact with the mounting surface. In one specific approach, the extent of relative rotation may be an angular extent, e.g., an angular extent of rotation of the hardware component relative to the mounting surface, an angular extent of rotation of the hardware socket relative to the mounting surface, an angular extent of rotation of the mounting surface relative to the hardware socket and/or the hardware component, etc., until the detection that the first portion of the hardware component is no longer in contact with the mounting surface. In another approach, the extent of relative rotation may correspond to a time that relative rotation occurs (at a predetermined constant rotational speed) until the detection that the first portion of the hardware component is no longer in contact with the mounting surface. The extent of angular relative rotation can be determined using this rate information, if desired.

The extent of relative rotation may be stored at any one or more locations, e.g., see operation 312 of method 300. For example, in one approach, the extent of relative rotation may be stored in physical memory in a logical table that is associated with a physical grid system, e.g., see FIG. 5.

In another approach, the extent of relative rotation may be additionally and/or alternatively stored in a cloud based memory system. Moreover, in another approach, the extent of relative rotation may be additionally and/or alternatively stored locally on the hardware socket and/or on any tool that may be used to apply rotational force to the hardware socket.

The hardware component may be removed from the mounting surface to enable disassembly of the apparatus to which the mounting surface belongs, e.g., to perform repairs, to replace components, etc.

When reassembly is desired, and/or if the hardware component is merely being re-torqued and no longer in contact with the mounting surface, the first portion of the hardware component may again come into contact with the mounting surface. The first portion of the hardware component may again come into contact with the mounting surface in response to one or more instructions being sent to cause a relative rotation between the hardware component and the mounting surface in a second direction in accordance with the stored extent of relative rotation, e.g., where the second direction is opposite the first direction. For example, subsequent the hardware component being disengaged from a first portion of the mounting surface, e.g., a first aperture of the mounting surface with threading therein, the hardware component may be engaged with a second portion of the mounting surface, e.g., a second aperture of the mounting surface with threading therein. As will now be described in optional operations 314-316 of method 300, based on storing the extent of relative rotation, the torque specifications that the hardware component previously had while engaged with the first portion of the mounting surface and/or is predetermined to have may be precisely applied to the hardware component while engaging with any mounting surface, e.g., such as the second portion of the mounting surface.

Operation 314 of method 300 includes detecting that the first portion of the hardware component contacts the mounting surface. In some approaches, detecting contact between the first portion of the hardware component and the mounting surface includes detecting a decrease in the amount of the emitted light received at the detector during relative rotation between the hardware component and the mounting surface in the second direction. Again, detection of emitted light is preferably performed while the hardware socket is positioned about the hardware component. A decrease in the amount of the emitted light may occur as a result of the emitted light no longer being able to pass between the first portion of the hardware component and the mounting surface, e.g., due to the first portion of the hardware component contacting the mounting surface and thereby blocking passage of light therebetween.

Upon detecting the first portion of the hardware component contacting the mounting surface, operation 316 of method 300 sending one or more instructions to cause a relative rotation between the hardware component and the mounting surface in a second direction in accordance with the stored extent of relative rotation. After the relative rotation in the second direction, the hardware component has approximately the same relative orientation as it had before the method 300 was performed, and thus is re-torqued to about the same extent.

In one approach, method 300 optionally includes notifying a user upon the hardware component being returned to the stored torque specifications within the mounting surface.

By continuing to re-torque a hardware component about a same extent in each engaging of the hardware component to a mounting surface, method 300 allows a preserved integrity and prolonged use of such components. Moreover, assuming that the hardware component is engaged with the mounting surface per manufacturing torque specifications just prior to the recording the extent of relative rotation that occurs in the first direction, e.g., see operation 306, manufacturing torque specifications may be selectively maintained in any subsequent engagement of the hardware component with the mounting surface. Accordingly, in sharp contrast to conventional torquing of hardware components, as a result of utilizing method 300 and/or various other embodiments and/or approaches described herein, users will not have to resort to researching for appropriate torque specifications of a hardware component, e.g., online, in a manual, etc., or request such torque specifications from manufacturers. Moreover, as a result of utilizing method 300 and/or various other embodiments and/or approaches described herein, users will not accidentally under-torque and/or over-torque hardware components, which would otherwise damage such hardware components.

FIGS. 4A-4D depict an apparatus 400 for maintaining torque specifications of a hardware component with a mounting surface, in accordance with one embodiment. As an option, the present apparatus 400 may be implemented in conjunction with features from any other embodiment listed herein, such as those described with reference to the other FIGS. Of course, however, such apparatus 400 and others presented herein may be used in various applications and/or in permutations which may or may not be specifically described in the illustrative embodiments listed herein. Further, the apparatus 400 presented herein may be used in any desired environment.

Figure 4B:
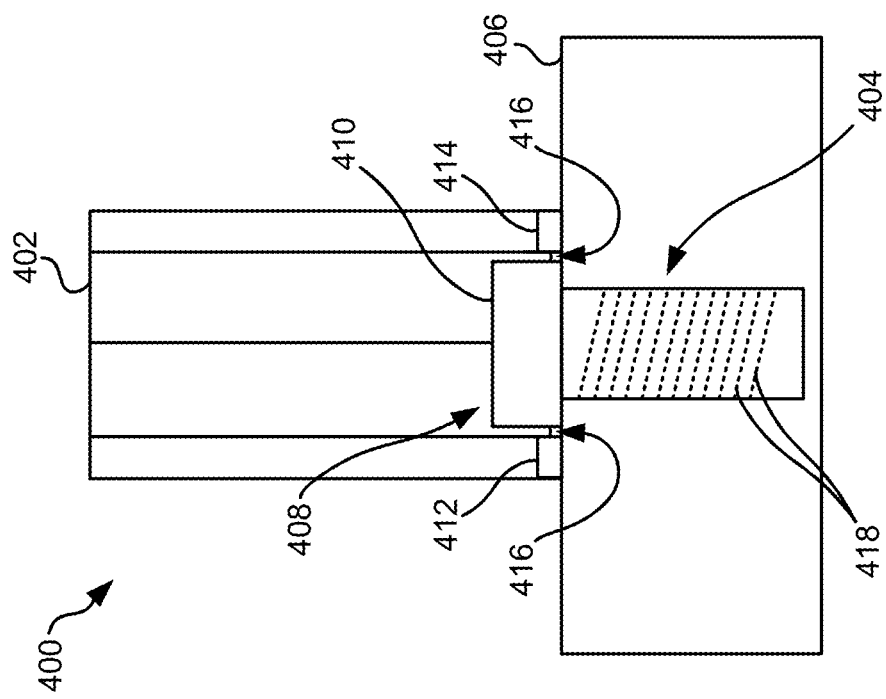
FIG. 4B is a partial cross sectional view of the hardware socket, the hardware component, and the mounting surface of FIG. 4A taken along line 4B.
Figure 4A:
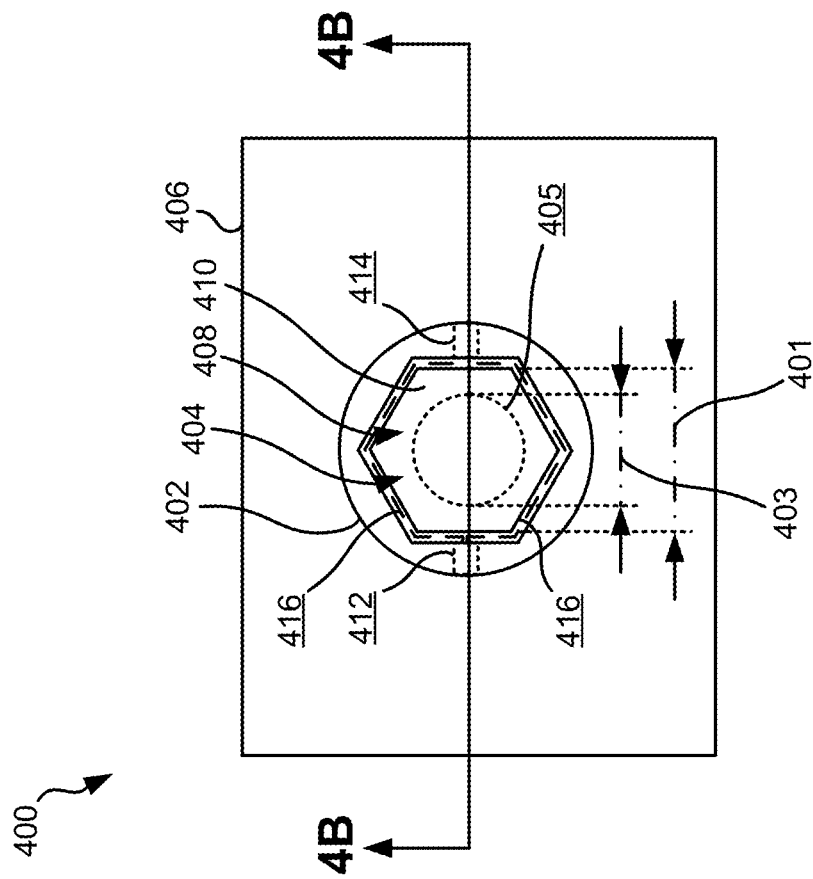
FIG. 4A is a top down view of a hardware socket, a hardware component, and a mounting surface, wherein a first portion of the hardware component is in contact with the mounting surface, in accordance with one embodiment.

FIG. 4A is a top down view of apparatus 400. In the current approach, apparatus 400 includes a hardware socket 402 (which in the present approach is a hexagonal socket), a hardware component 404 (which in the present approach is a hexagonal threaded bolt as shown by threads 418 of FIG. 4B), and a mounting surface 406. Note that in FIG. 4A, the top down view of apparatus 400 looks through an aperture of the hardware socket 402 to a top 408 of a first portion 410 of the hardware component 404. In the current approach, a width 401 of the first portion 410 of the hardware component 404 is greater than a width 403 of a tail portion 405 of the hardware component 404.

In the current approach, the hardware socket 402 has a light source 412 and a detector 414 integrated therein. Note that in other approaches, the light source 412 and the detector 414 may not be integrated within the hardware socket 402. For example, in an alternative approach, the hardware socket may be configured to allow light emitted from the light source outside of the hardware socket 402 to pass through the hardware socket 402, e.g., via an aperture or slot in the hardware socket 402, via a transparent portion (glass, plastic, adhesive, etc.) of the hardware socket 402, etc., to the detector 414 which may be positioned inside of and/or outside of and/or integrated with the hardware socket 402.

In the current approach, some errant light 416 emitted by the light source 412 may wrap around the hardware component 404, e.g., between a sidewall of the hardware component 404 and a sidewall the hardware socket 402. The detector 414 receives an amount of the emitted light 416, e.g., an initial amount. Note that light emitted by the light source 412 does not pass between (at least in the current positioning) the first portion 410 of the hardware component 404 and the mounting surface 406 because in FIG. 4A, the first portion 410 of the hardware component 404 is in contact with the mounting surface 406.

FIG. 4B is a partial cross sectional view of FIG. 4A taken along line 4B. The first portion 410 of the hardware component 404 is in contact with the mounting surface 406.

Figure 4C:
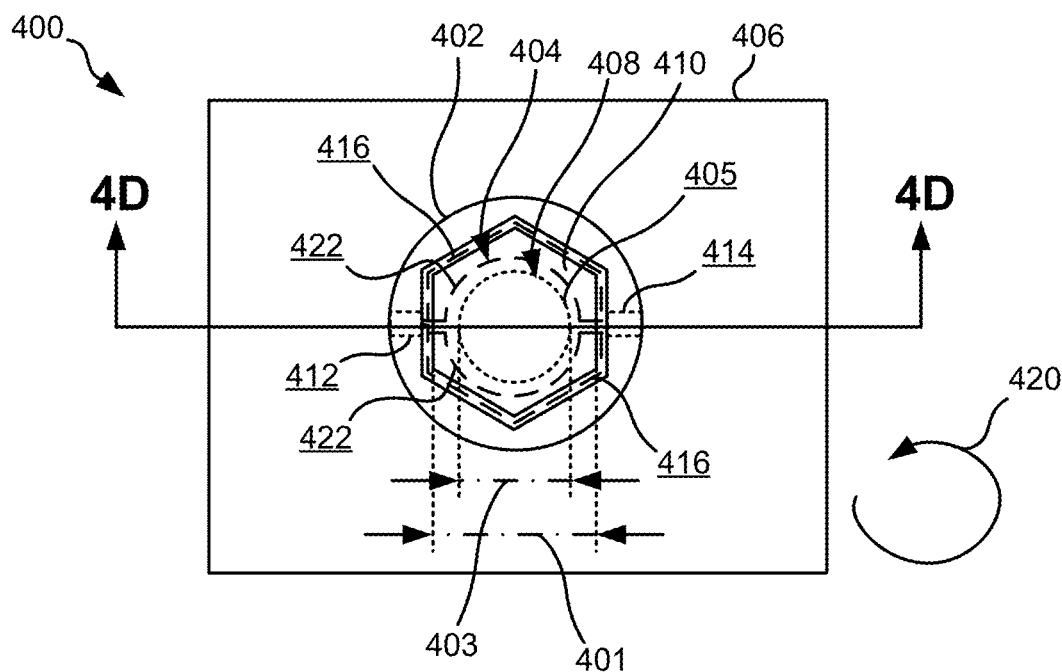
FIG. 4C is a top down view of the hardware socket, the hardware component, and the mounting surface of FIG. 4A, having the first portion of the hardware component not in contact with the mounting surface.
Figure 4D:
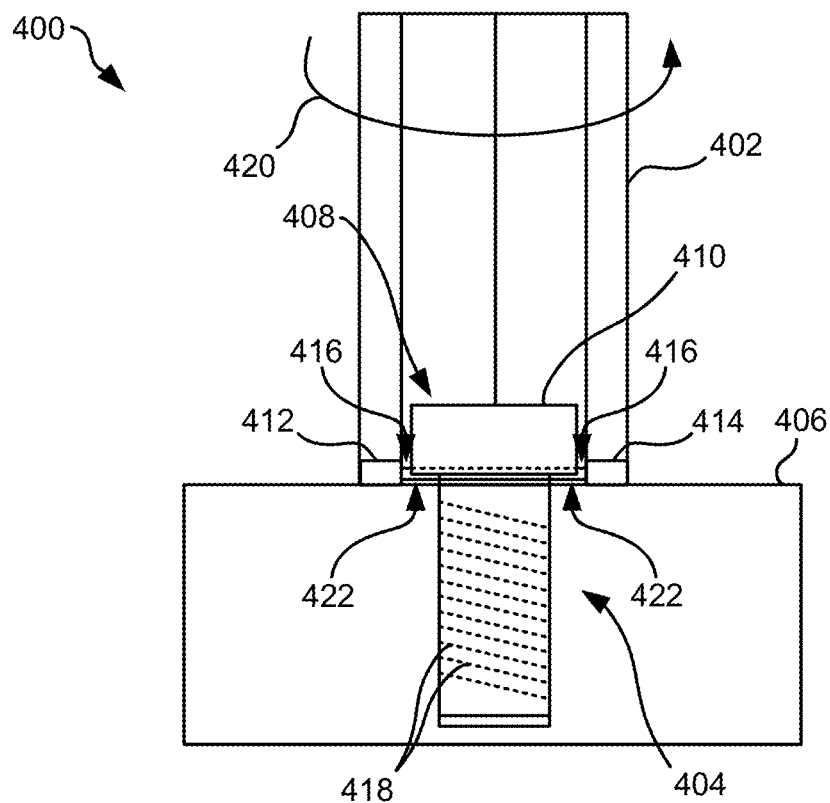
FIG. 4D is a partial cross sectional view of the hardware socket, the hardware component, and the mounting surface of FIG. 4C taken along line 4D.

Referring now to FIGS. 4C-4D, in response to one or more instructions being made, a relative rotation, e.g., in a first direction 420, may be caused between the hardware component 404 and the mounting surface 406, for causing the first portion 410 of the hardware component 404 to disengage from the mounting surface 406. Moreover, in FIG. 4C, the first portion 410 of the hardware component 404 is no longer in contact with the mounting surface 406 (also see FIG. 4D). Accordingly, as a result of the hardware component 404 no longer being in contact with the mounting surface 406, an additional amount of the emitted light is received at the detector 414, e.g., emitted light 422 that is emitted from the light source 412 and travels between the first portion 410 of the hardware component 404 and the mounting surface 406. Specifically, in the current approach, the additional amount of the emitted light 422 that is received at the detector 414 is able to travel between the first portion 410 of the hardware component 404 and the mounting surface 406 (depending on the relative width of the tail portion 405) because the tail portion 405 of the hardware component 404 has a relatively lesser width 403 than the width 401 of the first portion 410 of the hardware component 404. Accordingly, the emitted light 422 is able to pass alongside and/or wrap around the tail portion 405 of the hardware component 404 and be received at the detector 414.

An extent of relative rotation of that occurs in response to the one or more instructions to disengage the first portion 410 of the hardware component 404 from the mounting surface 406 until the detection that the first portion 410 of the hardware component 404 is no longer in contact with the mounting surface 406 is recorded. The extent of relative rotation may be stored, and used to return the hardware component 404 to its prior state.

Figure 5:
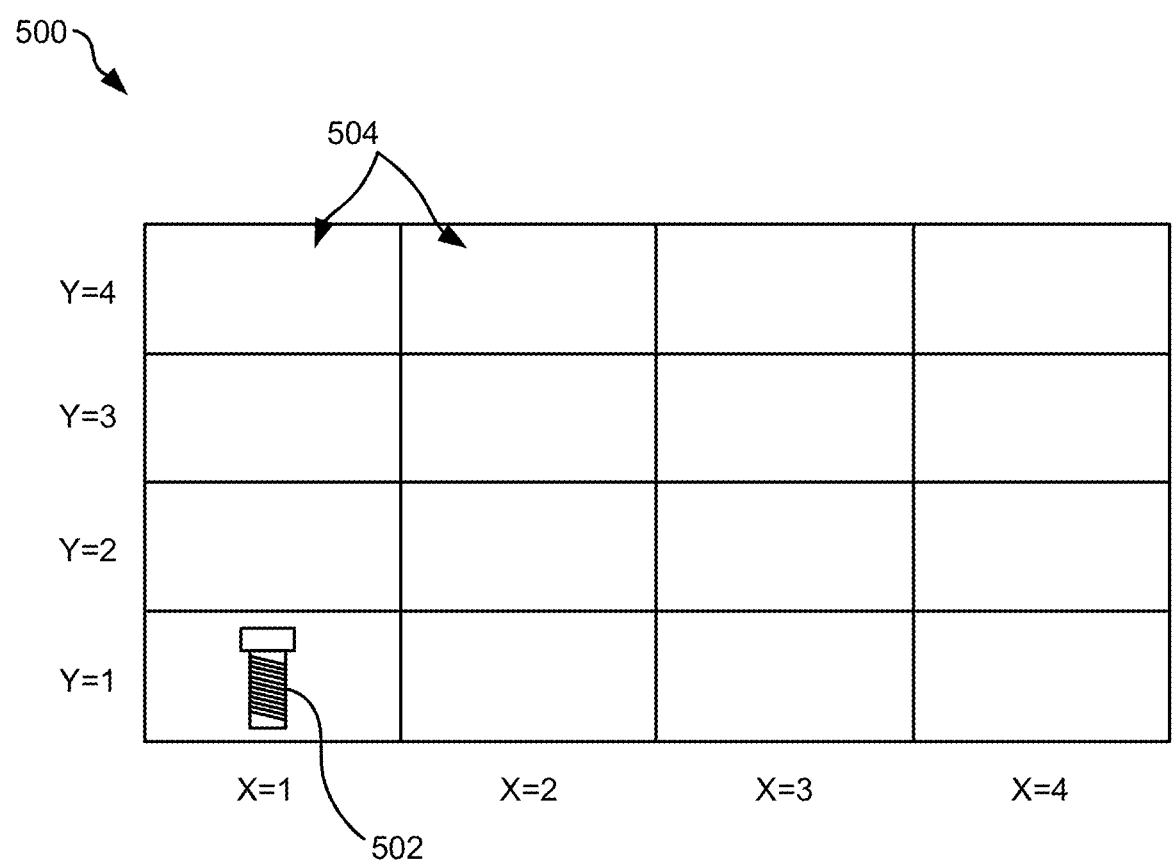
FIG. 5 is a grid system having a hardware component placed thereon, in accordance with one embodiment.

FIG. 5 depicts a physical grid system 500, in accordance with one embodiment. As an option, the present physical grid system 500 may be implemented in conjunction with features from any other embodiment listed herein, such as those described with reference to the other FIGS. Of course, however, such physical grid system 500 and others presented herein may be used in various applications and/or in permutations which may or may not be specifically described in the illustrative embodiments listed herein. Further, the physical grid system 500 presented herein may be used in any desired environment.

The physical grid system 500 includes a plurality of defined spaces 504 on which hardware components may be placed/stored subsequent the hardware components disengaging with a mounting surface. In one approach, a hardware component may be physically placed on a unique defined space 504 of the physical grid system 500, e.g., by a user, subsequent torque specifications such as an extent of relative rotation being associated with the hardware component and the specification being stored in memory. Moreover, a unique X, Y coordinate may be assigned to the each hardware component stored on a defined space of the physical grid system 500. These unique X, Y coordinates may be shared with a user so that the user is informed on which of the defined spaces 504 of the physical grid system 500 to place a hardware component.

For example, a unique X, Y coordinate of (1, 1) of the physical grid system 500 is associated with the first hardware component 502 as well as an extent of relative rotation, e.g., in a first direction, that occurs in response to the one or more instructions to disengage a first portion of the hardware component 502 from a mounting surface. The first hardware component 502 may be stored on the grid at the unique X, Y coordinate (1, 1) until it is determined that the first hardware component 502 is to be re-engaged with the mounting surface. In one approach, to re-engage the first hardware component 502 with the mounting surface, a user and/or a machine may take the first hardware component 502 from the physical grid system 500 and input the unique X, Y coordinate (1, 1) into a "smart" hardware tool that is configured to be utilized in engaging the first hardware component 502 with the mounting surface. Based on receiving the input X, Y coordinates (1, 1), the stored extent of relative rotation that was recorded during the previous disengagement of the first hardware component 502 from the mounting surface is retrieved. During re-engagement of the first hardware component 502 to the mounting surface, it may be detected that a first portion of the first hardware component 502 contacts the mounting surface. In response thereto, one or more instructions may be sent, e.g., to the "smart" hardware tool and/or the user, to cause a relative rotation between the hardware component 502 and the mounting surface in a second direction in accordance with the stored extent of relative rotation.

In some approaches, upon a relative rotation between the hardware component 502 and the mounting surface in a second direction being applied in accordance with the stored extent of relative rotation, the user may be notified to stop applying torque force to the first hardware component 502. In an alternative approach, upon a relative rotation between the hardware component 502 and the mounting surface in a second direction being applied in accordance with the stored extent of relative rotation, the "smart" hardware tool may automatically stop applying torque force to the relative rotation between the hardware component 502 and the mounting surface.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   instructing a light source to emit light within a hardware socket configured to disengage a hardware component from a mounting surface;
   while the hardware socket is positioned about the hardware component, detecting an amount of the emitted light received at a detector while a first portion of the hardware component is in contact with the mounting surface;
   while the hardware socket is positioned about the hardware component, sending one or more instructions to cause a relative rotation between the hardware component and the mounting surface;
   detecting that the first portion of the hardware component is no longer in contact with the mounting surface;
   recording an extent of relative rotation that occurs in response to the one or more instructions to disengage the first portion of the hardware component from the mounting surface until the detection that the first portion of the hardware component is no longer in contact with the mounting surface; and
   storing the extent of relative rotation.

2. The computer-implemented method of claim 1, wherein detecting that the first portion of the hardware component is no longer in contact with the mounting surface includes: detecting an increase in the amount of the emitted light received at the detector during relative rotation between the hardware component and the mounting surface in the first direction.

3. The computer-implemented method of claim 1, wherein the extent of relative rotation is stored in a logical table that is associated with a physical grid system.

4. The computer-implemented method of claim 1, comprising:
   detecting the first portion of the hardware component contact the mounting surface; and
   sending one or more instructions to cause a relative rotation between the hardware component and the mounting surface in a second direction in accordance with the stored extent of relative rotation.

5. The computer-implemented method of claim 4, wherein detecting the first portion of the hardware component contact the mounting surface includes: detecting a decrease in the amount of the emitted light received at the detector during relative rotation between the hardware component and the mounting surface in the second direction.

6. The computer-implemented method of claim 1, wherein the light source includes a laser, wherein a positioning of the light source with respect to the hardware socket and a positioning of the detector with respect to the hardware socket causes the emitted light received at the detector to originate at the light source and extend around the hardware component to the detector.

7. The computer-implemented method of claim 1, wherein the first portion of the hardware component is a head extending from a threaded tail portion.

8. The computer-implemented method of claim 1, wherein the amount of the emitted light received at the detector while the first portion of the hardware component is in contact with the mounting surface is zero.

9. A computer program product for maintaining torque specifications of a hardware component with a mounting surface, the computer program product comprising a computer readable storage medium having program instructions embodied therewith, the program instructions readable and/or executable by a computer to cause the computer to:
   instruct, by the computer, a light source to emit light within a hardware socket configured to disengage a hardware component from a mounting surface;
   while the hardware socket is positioned about the hardware component, detect, by the computer, an amount of the emitted light received at a detector while a first portion of the hardware component is in contact with the mounting surface;
   while the hardware socket is positioned about the hardware component, send, by the computer, one or more instructions to cause a relative rotation between the hardware component and the mounting surface;
   detect, by the computer, that the first portion of the hardware component is no longer in contact with the mounting surface;
   record, by the computer, an extent of relative rotation that occurs in response to the one or more instructions to disengage the first portion of the hardware component from the mounting surface until the detection that the first portion of the hardware component is no longer in contact with the mounting surface; and store, by the computer, the extent of relative rotation.

10. The computer program product of claim 9, wherein detecting that the first portion of the hardware component is no longer in contact with the mounting surface includes: detecting, by the computer, an increase in the amount of the emitted light received at the detector during relative rotation between the hardware component and the mounting surface in the first direction.

11. The computer program product of claim 9, wherein the extent of relative rotation is stored in a logical table that is associated with a physical grid system.

12. The computer program product of claim 9, the program instructions readable and/or executable by the computer to cause the computer to:

detect, by the computer, the first portion of the hardware component contact the mounting surface; and send, by the computer, one or more instructions to cause a relative rotation between the hardware component and the mounting surface in a second direction in accordance with the stored extent of relative rotation.

13. The computer program product of claim 12, wherein detecting the first portion of the hardware component contact the mounting surface includes: detecting, by the computer, a decrease in the amount of the emitted light received at the detector during relative rotation between the hardware component and the mounting surface in the second direction.

14. The computer program product of claim 9, wherein the light source includes a laser, wherein a positioning of the light source with respect to the hardware socket and a positioning of the detector with respect to the hardware socket causes the emitted light received at the detector to originate at the light source and extend around the hardware component to the detector.

15. The computer program product of claim 9, wherein the first portion of the hardware component is a head extending from a threaded tail portion.

16. The computer program product of claim 9, wherein the amount of the emitted light received at the detector while the first portion of the hardware component is in contact with the mounting surface is zero.

17. An apparatus, comprising:

a light source;

a detector;

a hardware socket configured to disengage a hardware component from a mounting surface;

a processor; and logic integrated with the processor, executable by the processor, or integrated with and executable by the processor, the logic being configured to:

instruct the light source to emit light within the hardware socket;

while the hardware socket is positioned about the hardware component, detect an amount of the emitted light received at the detector while a first portion of the hardware component is in contact with the mounting surface;

while the hardware socket is positioned about the hardware component, send one or more instructions to cause a relative rotation between the hardware component and the mounting surface;

detect that the first portion of the hardware component is no longer in contact with the mounting surface;

record an extent of relative rotation of the hardware component and/or an extent of rotation of the hardware socket that occurs in response to the one or more instructions to disengage the first portion of the hardware component from the mounting surface until the detection that the first portion of the hardware component is no longer in contact with the mounting surface; and store the extent of relative rotation.

18. The apparatus of claim 17, wherein detecting that the first portion of the hardware component is no longer in contact with the mounting surface includes: detecting an increase in the amount of the emitted light received at the detector during relative rotation between the hardware component and the mounting surface in the first direction.

19. The apparatus of claim 17, wherein the extent of relative rotation is stored in a logical table that is associated with a physical grid system.

20. The apparatus of claim 17, the logic being configured to:

detect the first portion of the hardware component contact the mounting surface; and send one or more instructions to cause a relative rotation between the hardware component and the mounting surface in a second direction in accordance with the stored extent of relative rotation.

* * * * *